US010723536B2

(12) United States Patent
Withers

(10) Patent No.: US 10,723,536 B2
(45) Date of Patent: Jul. 28, 2020

(54) ANTIOXIDANT ACTIVE FOOD PACKAGING

(71) Applicant: International Consolidated Business Group Pty Ltd, Melbourne (AU)

(72) Inventor: Philip Withers, Melbourne (AU)

(73) Assignee: INTERNATIONAL CONSOLIDATED BUSINESS GROUP PTY LTD, Melbourne, Victoria (AU)

( * ) Notice: Subject to any disclaimer, the term of this patent is extended or adjusted under 35 U.S.C. 154(b) by 230 days.

(21) Appl. No.: 15/762,872

(22) PCT Filed: Sep. 23, 2016

(86) PCT No.: PCT/AU2016/050900
§ 371 (c)(1),
(2) Date: Mar. 23, 2018

(87) PCT Pub. No.: WO2017/049364
PCT Pub. Date: Mar. 30, 2017

(65) Prior Publication Data
US 2018/0290811 A1     Oct. 11, 2018

(30) Foreign Application Priority Data

Sep. 24, 2015  (AU) ................................. 2015903898

(51) Int. Cl.
*B65D 81/28*         (2006.01)
*A23B 4/10*          (2006.01)
(Continued)

(52) U.S. Cl.
CPC ................ *B65D 81/28* (2013.01); *A23B 4/00* (2013.01); *A23B 4/10* (2013.01); *A23B 4/20* (2013.01);
(Continued)

(58) Field of Classification Search
CPC ........ B65D 81/28; B65D 65/42; B65D 81/24; A23B 4/10; A23B 4/20; A23B 4/00; B32B 27/08; B32B 27/18; B32B 27/00; B32B 15/08; B32B 27/28; B32B 27/302; B32B 27/34; B32B 27/322; B32B 27/304; B32B 27/306; B32B 2307/7244; B32B 2307/74; B32B 2439/46; B32B 2439/70;
(Continued)

(56) References Cited

U.S. PATENT DOCUMENTS

2005/0202120 A1     9/2005   Liu et al.
2012/0276357 A1    11/2012   Soto-Valdez et al.

FOREIGN PATENT DOCUMENTS

WO       2013/084175 A1     6/2013

OTHER PUBLICATIONS

International Search Report for PCT/AU2016/050900 dated Dec. 12, 2016.
(Continued)

*Primary Examiner* — Michael C Miggins
(74) *Attorney, Agent, or Firm* — Orrick, Herrington & Sutcliffe, LLP

(57) ABSTRACT

Food packaging material comprising a polymeric material and a natural antioxidant. The natural antioxidant may be extracted, isolated and/or derived from plant material. A method for forming a food packaging material is also provided, comprising forming a mixture comprising a natural antioxidant and a polymeric resin and processing the mixture to form a food packaging material.

5 Claims, 5 Drawing Sheets

(51) Int. Cl.
*A23B 4/20* (2006.01)
*B32B 27/08* (2006.01)
*B65D 65/42* (2006.01)
*A23L 3/3472* (2006.01)
*B32B 27/18* (2006.01)
*B32B 27/00* (2006.01)
*A23B 4/00* (2006.01)
*B32B 27/32* (2006.01)
*B65D 81/24* (2006.01)
*B32B 15/08* (2006.01)
*B32B 27/28* (2006.01)
*B32B 27/30* (2006.01)
*B32B 27/34* (2006.01)
*C08K 11/00* (2006.01)
*C08K 5/00* (2006.01)
*C08K 5/13* (2006.01)

(52) U.S. Cl.
CPC ............ *A23L 3/3472* (2013.01); *B32B 15/08* (2013.01); *B32B 27/00* (2013.01); *B32B 27/08* (2013.01); *B32B 27/18* (2013.01); *B32B 27/28* (2013.01); *B32B 27/302* (2013.01); *B32B 27/304* (2013.01); *B32B 27/306* (2013.01); *B32B 27/32* (2013.01); *B32B 27/322* (2013.01); *B32B 27/34* (2013.01); *B65D 65/42* (2013.01); *B65D 81/24* (2013.01); *C08K 5/005* (2013.01); *C08K 11/00* (2013.01); *A23V 2002/00* (2013.01); *B32B 2250/03* (2013.01); *B32B 2274/00* (2013.01); *B32B 2307/7244* (2013.01); *B32B 2307/74* (2013.01); *B32B 2435/02* (2013.01); *B32B 2439/40* (2013.01); *B32B 2439/46* (2013.01); *B32B 2439/62* (2013.01); *B32B 2439/70* (2013.01); *C08K 5/13* (2013.01)

(58) Field of Classification Search
CPC ............ B32B 2274/00; B32B 2439/40; B32B 2435/02; B32B 2439/02; B32B 2250/03; B32B 27/32; A23L 3/3472; C08K 11/00; C08K 5/005; C08K 5/13; A23V 2002/00
See application file for complete search history.

(56) References Cited

OTHER PUBLICATIONS

Written Opinion of the International Searching Authority for PCT/AU2016/050900 dated Dec. 12, 2016.

Peltzer, M., et al., 'Determination of Oxidation Parameters by DSC for Polypropylene Stabilised with Hydroxytyrosol (3,4-Dihydroxy-Phenylethanol)' J. Therm. Anal. Cal., 2009, vol. 96, No. 1, pp. 243-248.

Dicastillo, C., et al., 'Development of New Antioxidant Active Packaging Films Based on Ethylene Vinyl Alcohol Copolymer (EVOH) and Green Tea Extract' J. Agric. Food Chem., 2011, vol. 95, pp. 7832-7840.

ANTIOXIDANT ACTIVE FOOD PACKAGING

FIELD

The present invention relates to antioxidant active food packaging.

BACKGROUND

Lipid oxidation is the main cause of spoilage, colour change and degradation in foodstuffs, which significantly limits the preservation and shelf life of packaged food. Non-natural antioxidants have been used in the polymer industry to prevent thermal degradation of polymers during processing. However, potential toxicity from such antioxidants into food products makes them unsuitable for use in food packaging. Furthermore, consumers have a strong prejudice against the presence of non-natural substances in food In this context, there is a need for safe, nature-based antioxidant active food packaging.

SUMMARY

According to the present invention, there is provided food packaging material comprising a polymeric material and a natural antioxidant.

The natural antioxidant may be present in the food packaging material in an amount between about 0.00001% and 20% by weight, or in an amount between about 0.0001% and 5% by weight, or in an amount between about 0.001% and 1% by weight, or in an amount between about 0.005% and 0.1% by weight, or in an amount between about 0.001% and 0.01% by weight.

The natural antioxidant may be present in the food packaging material in an amount between about 0.1 ppm and 20,000 ppm, or in an amount between about 1 ppm and 50,000 ppm, or in an amount between about 10 ppm and 10,000 ppm, or in an amount between about 50 ppm and 1000 ppm, or in an amount between about 10 ppm and 150 ppm, or in an amount between about 10 ppm and 100 ppm, or in an amount up to about 40 ppm The natural antioxidant may be extracted, isolated and/or derived from plant material.

The plant material may be selected from fruits/berries, a herb, a spice, teas and combinations thereof.

The fruits/berries may be selected from plum, prune, grape, raisin, blueberry, raspberry, blackberry, strawberry, Kakadu plum, lemon aspen, Davidson's plum, quandong, riberry, orange, cocoa, cherry, cranberry, bilberry, kiwifruit, acai berry, grapefruit, pear, apricot, banana, apple, blackcurrant, avocado, boysenberry, cantaloupe, coconut, dragonfruit, durian, date, elderberry, gojiberry, guava, huckleberry, jackfruit, juniper berry, kumquat, lemon, lime, Australian desert lime, bush tomato, mango, honeydew melon, watermelon, mulberry, nectarine, olive, mandarin, papaya, peach, persimmon, pomegranate, pineapple, pomelo, quince, mango, red current, rambutan, starfruit, tamarillo, ugil fruit, coffee, and combinations thereof.

The herb may be selected from leaves, flowers, seeds, bark, bulbs, aril and roots, including basil, dill, bay leaf, chive, cress, alfalfa, marshmallow, lavender, lemon grass, Tasmania pepper, lemon myrtle, anise myrtle, marjoram, mint, mugwort, lemon balm, epazote, curry leaf, parsley, shiso, sansho leaf, lovage, hyssop, valerian, yarrow, sorrel, tarragon, chervil, jimbu, woodruff, hemp, rue, mitsuba, rosemary, sage, oregano, thyme, spearmint, peppermint, coriander, cinnamon, cassia, fennel, fenugreek, dill mustard, clove, saffron, onion, garlic, leek, ginger, turmeric, grape seed, black pepper, star anise, soy, mace and combinations thereof.

The tea may be green, white, yellow, herbal, post-fermented, oolong or black. The tea may be obtained from *Camellia sinensis.*

The herb may be a perennial herb.

The herb may be selected from the genera *Rosmarinus, Salvia* or *Origanum*. In one embodiment the herb may be selected from *Rosmarinus officinalis, Salvia officinalis, Origanum vulgaro,* and combinations thereof. In another embodiment the herb may be rosemary.

The spice may be selected from leaves, flowers, seeds, bark, bulbs, aril and roots, including wattleseed, saffron, ginger, turmeric, grape seed, chilli pepper, cumin, allspice, anise, carraway, cardamom, cassia, cinnamon, clove, coriander, cumin, fennel, fenugreek, galangal, garlic, ginger, horseradish, kokum, mustard, nutmeg, poppy seed, rose, paprika, saffron, sumac, tamarind, turmeric, vanilla, sesame, sarsaparilla, sassafras, tonka bean, and combinations thereof.

The natural antioxidant may be selected from phenols, polyphenolics, phenolic acids, phenolic esters, phenolic monoterpenes, phenolic diterpenes, carotenoids, curcumin, xanthones, vitamins A, E and C, caffeoyl derivatives, citric acid, ascorbic acid, mono-, di-, or triterpenes, flavanoids, terpenoids, lignans, sulfides, plant sterols, curcumins, stilbenoids, phthalides, tocotrienols, tocopherols, and combinations thereof.

The natural antioxidant may be selected from caffeic acid, rosmarinic acid, carnosol, carnosic acid, and combinations thereof.

The natural antioxidant may be a rosemary extract comprising phenolic diterpenes.

The natural antioxidant may be a rosemary extract comprising carnosic acid and carnosol. In one embodiment the natural antioxidant may be a rosemary extract comprising at least 40% carnosic acid and carnosol by weight.

The natural antioxidant may be selected from lutein, rutin, anthocyanin, α-pinene, borneol, (−)-camphene, 1,8-cineole, camphor, verbenone, bornyl acetate, 12-O-methylcarnosic acid, a caffeoyl derivative, lupane, oleanane, an ursane triterpene, ursolic acid, quercetin, rofficerone, a monoterpene, myrcene, 7-methylepirosmanol, epirosmanol, camphor, catechin, carvacrol, isoscutellarein 7-O-glucoside, genkwanin, p-Cymene, linalool, gamma-terpinene, thymol, β-pinene, eucalyptol, linoleic acid, rosmariquinone, monoterpenic hydrocarbons, oxygenated monoterpenes, sesquiterpene hydrocarbons, (−)-methyl jasmonate, rosmanol, rosmadial, o-quinone, p-quinone, eriocitrin, luteolin 3-O-beta-D-glucuronide, hesperidin, diosmin, isoscutellarein 7-O-glucoside, hispidulin 7-O-glucoside, gingerol, shogaol, zingerone, 4-hydroxycinnamoyl methane, kaempherol, rhamnetin, capsaicin, capsaicinol, phenolic volatile oils, eugenol, acetyleugenol, ascorbyl palmitate, isoeugenol, tannins, beta-carotene, beta-sitosterol, hydroquinone, linalyl-acetate plant 3-17, myrcene, terpinen-4-ol, cuminal, -γ-terpinene, pinocarveol, linalool, 1-methyl-2-(1-methylethyl)benzene, carotol, isorosmanol, atuntzensin A, rosmanol-7-ethyl ether, dimethoxy-rosmanol, rosmadial, safficinolide, sageone, rosmriquinone (Miltrone), rosmaridiphenol, physcion, apigenin, hispidulin, cirsimaritin, 5,4'-dihydroxy-6,7,8-trimethoxy flavone, 5-hydroxy-7,4'-dimethoxy flavone, methyl and ethyl esters of carnosol, caffeic acid, protocatechuic acid, 2-caffeoyloxy-3-[2-(4-hydroxybenzyl)-4,5-dihydroxy]phenylpropionic acid, flavonoids, eriodictyol, dihydroquercetin, dihydrokaempherol, p-cumene-2,3-diol, gallic acid, salvigenin, luteolin, eupafolin, luteolin-7-O-glucoside, homoplantaginin, apigenin-7-O-glucoside, 6-O-caffeoyl-beta-D-fructofuranosyl-(2->1)-alpha-D-glucopyranoside, 1-O-caffeoyl-beta-D-apiofuranosyl-(1->6)-beta-D-glucopyranoside, 1-O-p-hydroxybenzoyl-beta-D-apiofuranosyl-(1->6)-beta-D-glucopyranoside, 1-O-(2-hydroxy-5-2-hydroxy-ethyl)phenyl-6-O-trans-caffeoyl)-beta-D-glucopyranoside, 4-O-(5-O-(3,5-dimethoxy-4-hydroxybenzoyl)-beta-D-apiofuranosyl-(1->2)-beta-D-glucopyranoside, 6-O-E-ferroyl-(alpha and beta)-glucopyranoside, (+)-1-hydroxypinoresinol-1beta-D-glucoside, (+)-fraxiresinol-1-beta-D-glucoside and combinations thereof, catechine compounds including (−)-epicatechin (EC), (−)-epicatechin gallate (ECG), (−)-epigallocatechin (EGC), and (−)-epigallocatechin gallate (EGCG), vanillic, chlorogenic and pentacyclic triterpenes such as ursloic, oleanolic, betulinic acid, botulin, alpha-amyrin, beta-amyrin and combinations thereof.

The natural antioxidant may be organic.

The natural antioxidant may be incorporated in and/or on a coating, a layer, a sheet or a wall of the food packaging material.

The natural antioxidant may, in use, migrate onto and/or into the food.

The food packaging material may further comprise an antioxidant which is an isomer of a natural antioxidant. The isomer may be a stereoisomer.

The antioxidant which is an isomer of a natural antioxidant may be sodium erythorbate.

The polymeric material may be selected from polyethylene terephthalate (PET), polylactic acid (PLA), polyethylene (PE), ethylene vinyl alcohol copolymer (EVOH), polypropylene (PP), polyvinylidene chloride (PVdC), polystyrene (PS), polytertraflouroethylene (PTFE), polyvinyl chloride (PVC), polyamide or nylon (PA), and combinations thereof. In one embodiment the polymeric material is low-density polyethylene (LDPE) or linear low-density polyethylene (LLDPE).

The food packaging material may comprise single or multiple polymeric layers. In one embodiment the food packaging material comprises multiple polymeric layers.

The food packaging material may comprise first, second and barrier polymeric layers, wherein the first layer comprises the natural antioxidant, the second layer comprises an oxygen scavenger, and wherein the second layer is located between the first layer and the barrier layer.

The food packaging material may be produced by extrusion.

The food packaging material may be a film, for example a cling film.

The present invention further provides food packaging formed from or comprising the food packaging material described above.

The food packaging may be a wrap, a wrapper, a bag (for example a reclosable bag or a freezer bag), a container, a tray, a sheet, a carton, a box, a bottle, a bottle cap, a liner, a tube, a barrier sheet, a block and combinations thereof. In one embodiment the food packaging material is a bag, such as for example a PE bag.

The present invention also provides a method, comprising:

forming a mixture comprising a natural antioxidant and a polymeric resin; and processing the mixture to form a food packaging material.

The processing may comprise extruding, moulding, vacuum forming, casting or lamination.

DESCRIPTION OF EMBODIMENTS

Figure 1:
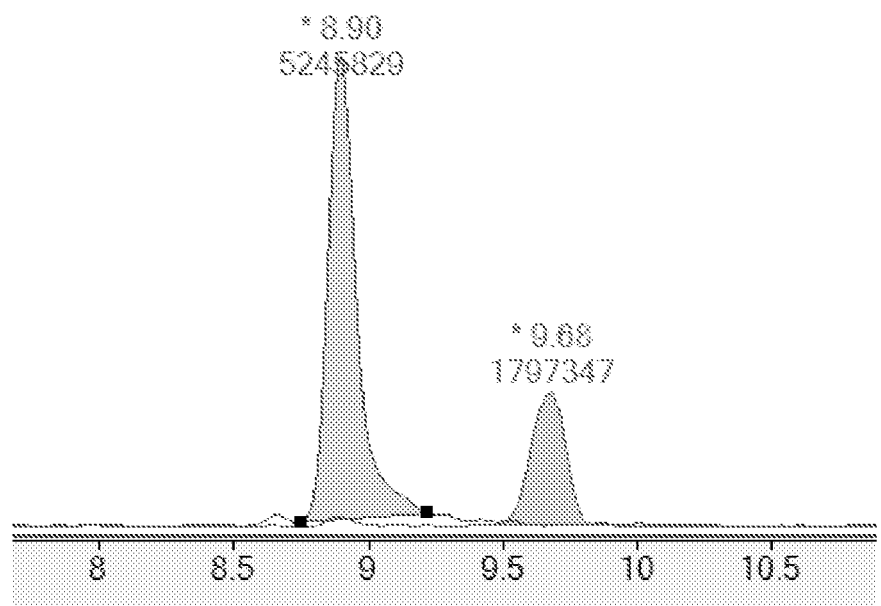
FIG. 1: Chromatogram showing peaks for carnosol and carnosic acid migrated out of sample 1 of Example 2.
Figure 2:
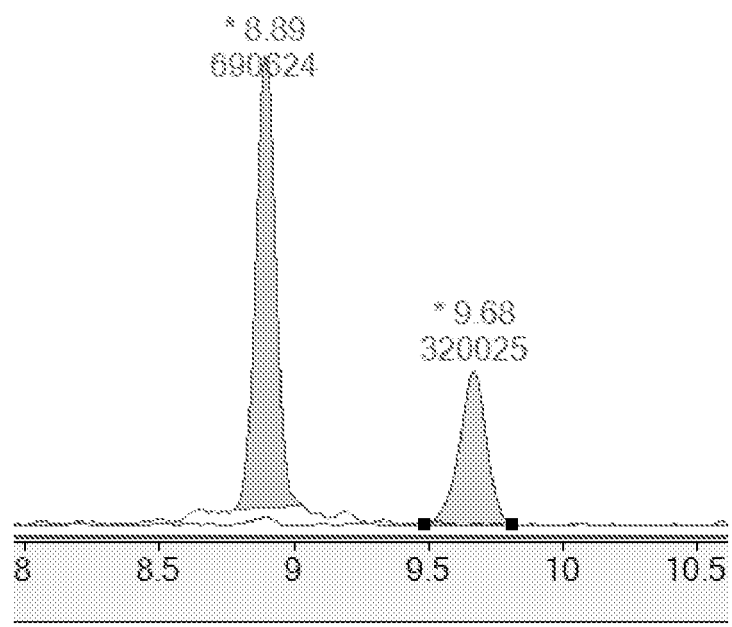
FIG. 2: Chromatogram showing peaks for carnosol and carnosic acid migrated out of sample 2 of Example 2.
Figure 3:
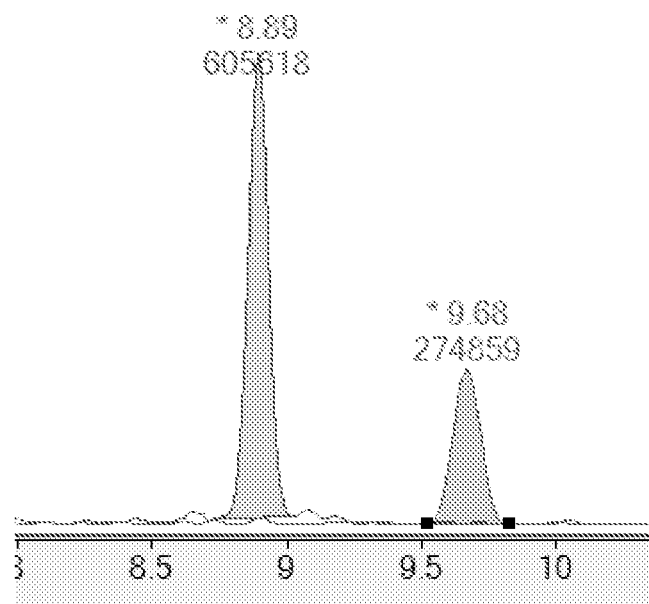
FIG. 3: Chromatogram showing peaks for carnosol and carnosic acid migrated out of sample 3 of Example 2.
Figure 4:
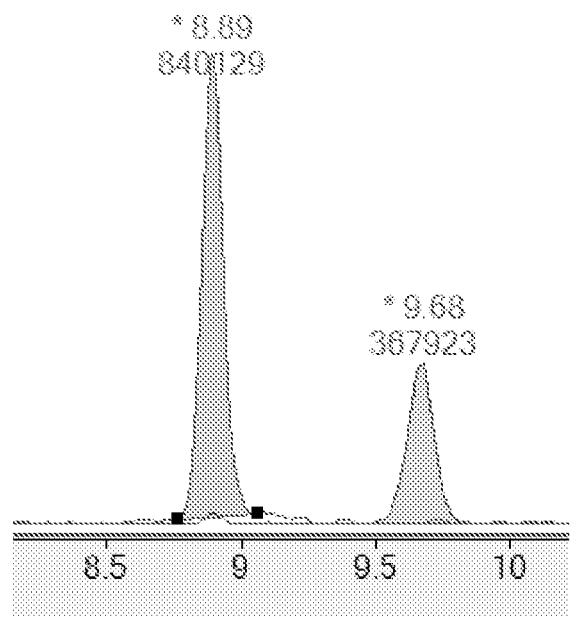
FIG. 4: Chromatogram showing peaks for carnosol and carnosic acid migrated out of sample 4 of Example 2.
Figure 5:
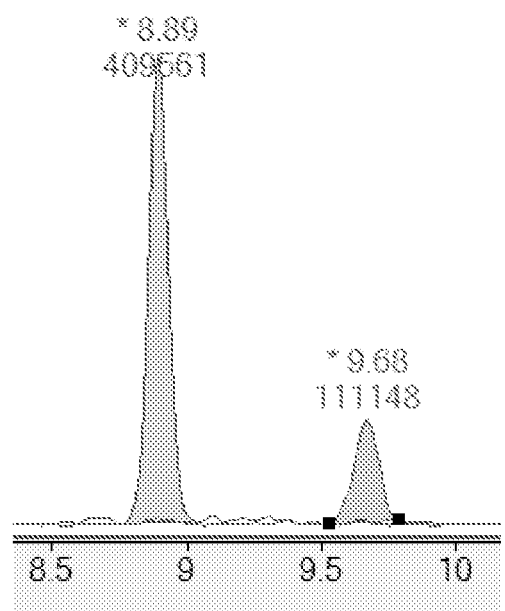
FIG. 5: Chromatogram showing peaks for carnosol and carnosic acid migrated out of sample 5 of Example 2.
Figure 6:
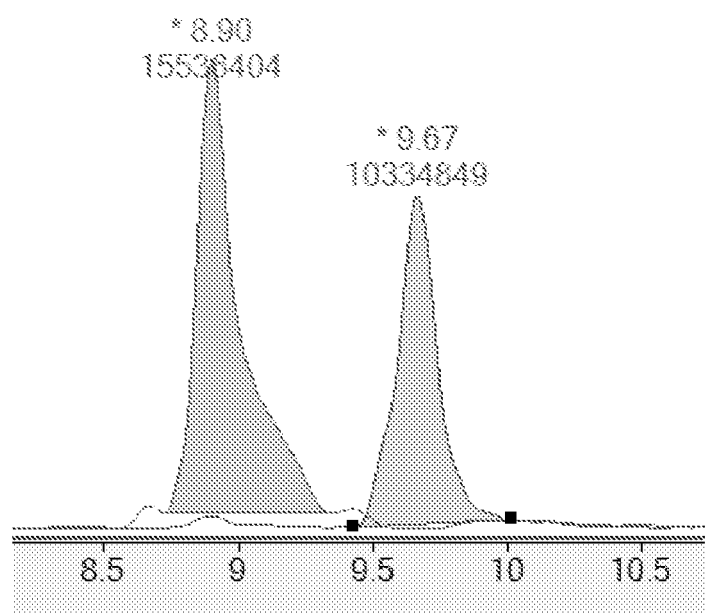
FIG. 6: Chromatogram showing peaks for carnosol and carnosic acid migrated out of the commercial rosemary extract.

The present invention is directed to a food packaging material comprising a polymeric material and a natural antioxidant. As used herein the term "natural antioxidant" is understood to mean that the antioxidant is a naturally-occurring product, compound or mixture of compounds. The naturally occurring product, compound or mixture of compounds is typically obtained from a natural source. Alternatively, naturally occurring compounds may be synthesised in a laboratory utilising synthetic chemistry or purchased from commercial sources.

Antioxidant active food packaging material according to embodiments of the present invention generally comprises a natural antioxidant incorporated in and/or on a polymeric material. The polymeric material may be selected from PET, PLA, PE, EVOH, PP, PVdC, PS, PVC, PA, and combinations thereof. Typically, the polymeric material will be chosen based on the desired end use of the packaging material. For example, PVC is commonly used for packaging fresh products including meat and pre-cooked meals. High-density PE is commonly used in films and containers for frozen foods.

The natural antioxidant may be incorporated in and/or on the polymeric material at one or more of the following production stages: (i) during the polymerisation stage (i.e. directly during production of the polymeric material); (ii) addition to a finished granulate in a subsequent processing stage, such as a compounding or mixing stage; (iii) in a processing machine itself, such as in an extruder or an injection mould; and/or (iv) applied to a finished process article itself, such as for example, as part of a coating. (v) in an encapsulated membrane that provides protection from the process to incorporate into the polymeric material but release the antioxidant into that material.

To obtain a homogeneous mixture of the polymeric material and the natural antioxidant, the natural antioxidant may be incorporated in the polymeric material at the compounding or mixing stage. At the compounding or mixing stage the natural antioxidant may be added as a solid, a liquid, an oil, a powder or as an emulsion. In one embodiment, the natural antioxidant may be compounded or mixed with a polymeric resin, a carrier and other optional additives, such as a cling additive, to form a masterbatch. The masterbatch may optionally comprise other conventional functional plastic additives suitable for use in food packaging, for example tackifiers, dispersing agents and compounds, or colorants. Suitable carriers include porous resins, such as microporous LLDPE, high density polyethylene (HDPE), LDPE, nylon, polystyrene, or high structured or high surface area silica, or wax such as polyethylene wax (low molecular weight polyethylene), styrene-modified polymers and copolymers, such as styrene-ethylene-butylene polymers, styrene-isoprene copolymers, styrene-ethylene-propylene block copolymers and styrene-butadiene copolymers, such as K resins available from Chevron Philips, or natural or synthetic zeolites.

Other equivalent or alternative processing techniques may also be used for incorporating the natural antioxidant additive in and/or on the polymeric material.

The masterbatch of the polymeric resin incorporating the natural antioxidant additive may subsequently be processed, for example, by extrusion (including cast film extrusion and blow film extrusion), moulding, or lamination to form the food packaging material. The natural antioxidant additive may be incorporated in and/or on a coating, a layer, a sheet or a wall of the food packaging material. The sheet or wall of the food packaging material may comprise one or more layers of the polymeric material.

The food packaging material may comprise multiple polymeric layers. In one embodiment the food packaging material comprises an outer barrier layer, a first layer comprising the natural antioxidant and a second layer comprising an oxygen scavenger. The second layer is located in between the barrier layer and the first layer. In use, the first layer is intended to come into contact with the food so as to permit migration of the natural antioxidant onto and/or into the food. The second layer including an oxygen scavenger assists in the removal or minimisation of oxygen in the package. The barrier layer prevents or minimises passage of oxygen into the package. An appropriate oxygen scavenger may be chosen depending on the oxygen level in the headspace of the package, how much oxygen is trapped within the food initially and the amount of oxygen that will be transported from the surrounding air into the package during storage. Examples of suitable oxygen scavengers that may be incorporated into polymers include iron-based compounds, ascorbate, metallic salts, cobalt catalysts, and catechol. In order to minimise the potential for metallic taints being imparted to food, non-iron compounds may be preferred.

The thickness of individual polymeric layers may be sufficient to perform the intended function of the layer, such as to function as a barrier layer, as an oxygen scavenger layer, or as an antioxidant layer.

A multi-layer packaging material may be produced by, for example, extrusion and lamination. One exemplary method of preparing a multi-layer film involves co-extruding polymeric layers. The multi-layer co-extruded film can then be laminated to a barrier layer, either by first cooling and subsequent lamination, or by extrusion onto the barrier layer.

In some embodiments the food packaging material may be a film, for example a cling film. The present invention also embraces food packaging formed from or comprising the food packaging material described herein. Non-limiting examples of food packaging include a wrap, a wrapper, a bag (such as a reclosable bag or freezer bag), a container, a tray, a sheet, a carton, a bottle cap, a box, a bottle, a liner, a barrier sheet, a block and combinations thereof.

The natural antioxidant additive may be incorporated in and/or on the polymeric material in an amount such that it is able to migrate from the polymeric material onto and/or into the food and thereby inhibit or retard oxidation of the food. The antioxidant may scavenge highly reactive species such as free radicals, superoxide and singlet oxygen which are generated in food, or in the surrounding atmosphere, and are involved in lipid oxidation. The antioxidant may assist neutralisation of pro-oxidant catalysts. The antioxidant effect may control, delay or inhibit oxidation and deterioration of food quality, preserve colour, flavour and aroma of food, and may maintain nutritional value and prolong shelf life of food products.

The natural antioxidant may be present in the food packaging material in an amount between about 0.00001% and 20% by weight, or in an amount between about 0.0001% and 5% by weight, or in an amount between about 0.001% and 1% by weight, or in an amount between about 0.005% and 0.1% by weight, or in an amount between about 0.001% and 0.01% by weight.

The natural antioxidant may be present in the food packaging material in an amount between about 0.1 ppm and 20,000 ppm, or in an amount between about 1 ppm and 50,000 ppm, or in an amount between about 10 ppm and 10,000 ppm, or in an amount between about 50 ppm and 1000 ppm, or in an amount between about 10 ppm and 150 ppm or in an amount between about 10 ppm and 100 ppm, or in an amount up to about 40 ppm.

In some embodiments, natural antioxidants are combined so as to achieve a synergistic effect. For example, the radical scavenging activity of a sage antioxidant may be combined with the chelating ability of citric acid. This approach utilises differing antioxidant mechanistic pathways thereby enabling greater efficacy as compared to use of a single antioxidant. The amounts of each antioxidant may be the same or different. In one embodiment, vitamin C may synergistically interact with tocopherols by regenerating the latter molecule. In another embodiment, phenolic acids such as rosmarinic acid from the herb rosemary may synergistically interact with beta-tocopherol. Polyphenols including phenolic acids and flavonoids may interact synergistically with vitamin antioxidants thereby enhancing the antioxidant effect.

The natural antioxidant may be extracted, isolated and/or derived from plant material. Typically, the natural antioxidant is an extract from a plant material. The natural antioxidants may be organic.

As used herein the term "extract" refers to an active preparation derived from plant material. In the context of this specification, by "active" it is meant that the extract is capable of producing a desired antioxidant effect as disclosed herein. An extract is obtained by a process of "extraction" which will be understood by those skilled in the art as a method for extracting the active principles. The extraction process may comprise treating plant material with a liquid, or a supercritical fluid to dissolve the active preparation and separate the same from residual unwanted plant material. An extract may be in liquid form (for example as a decoction, solution, infusion or tincture) or solid form (for example as a powder or granules).

Exemplary extraction processes include treatment with food-grade solvents including hexane, acetone, ethanol, water or mixture thereof, mechanical extraction by grounding the plants, mixing with oil, then heating, stirring and press filtering, supercritical carbon dioxide extraction in multiple steps using pressurised hot water extraction with small amounts of ethanol, ultrasound-assisted methanol extraction and hydrodistillation and maceration with ethanol.

Extracts suitable for use in the food packaging material may be aqueous, gels, oil and/or organic solvent based extracts, obtained by single, combined and/or successive extraction of any available plant material. Suitable extraction processes, and suitable solvents and liquids for extraction are known to those skilled in the art. Aqueous solvents (for example water, acids, bases); oils (for example coconut); and organic solvents (for example hexane, ethanol, methanol, acetone, tetrahydrofuran and chloroform) used for extraction can either be used sequentially for extraction or in combination mixture. Supercritical fluid extraction using, for example, supercritical nitrogen or carbon dioxide, may also be used to obtain extracts.

Further, it will be appreciated by those skilled in the art that an extract may be subjected to one or more post-extraction steps to, for example, increase or maintain the stability of the extract, modify or change the physical form of the extract or assist in formulating the extract into food packaging material.

Extracts may be derived from any suitable plant material. Suitable plant material includes, but is not limited to, leaves, roots, bark, fruits, shoots, nuts (such as hazelnuts, peanuts, almonds walnuts and the like), seeds and flowers. The plant material may be, for example, fresh, dried or freeze dried. For any given plant species more than one plant material may be used for the production of extracts. Those skilled in the art will appreciate that natural antioxidant extracts may also be obtained from commercial sources.

The plant material may be selected from fruits/berries, a herb, a spice, teas and combinations thereof. The herb may be a perennial herb.

The fruits/berries may be selected from plum, prune, grape, raisin, blueberry, raspberry, blackberry, strawberry, Kakadu plum, lemon aspen, Davidson's plum, quandong, riberry, orange, cocoa, cherry, cranberry, bilberry, kiwifruit, acai berry, grapefruit, pear, apricot, banana, apple, blackcurrant, avocado, boysenberry, cantaloupe, coconut, dragonfruit, durian, date, elderberry, gojiberry, guava, huckleberry, jackfruit, juniper berry, kumquat, lemon, lime, Australian desert lime, bush tomato, mango, honeydew melon, watermelon, mulberry, nectarine, olive, mandarin, papaya, peach, persimmon, pomegranate, pineapple, pomelo, quince, mango, red current, rambutan, starfruit, tamarillo, ugil fruit, coffee, and combinations thereof.

The herb may be selected from leaves, flowers, seeds, bark, bulbs, aril and roots, including basil, dill, bay leaf, chive, cress, alfalfa, marshmallow, lavender, lemon grass, Tasmania pepper, lemon myrtle, anise myrtle, marjoram, mint, mugwort, lemon balm, epazote, curry leaf, parsley, shiso, sansho leaf, lovage, hyssop, valerian, yarrow, sorrel, tarragon, chervil, jimbu, woodruff, hemp, rue, mitsuba, rosemary, sage, oregano, thyme, spearmint, peppermint, coriander, cinnamon, cassia, fennel, fenugreek, dill mustard, clove, saffron, onion, garlic, leek, ginger, turmeric, grape seed, black pepper, star anise, soy, mace and combinations thereof.

The tea may be green, white, yellow, herbal, post-fermented, oolong or black. The tea may be obtained from *Camellia sinensis.*

The herb may be selected from the genera *Rosmarinus, Salvia* or *Origanum.* In one embodiment the herb may be selected from *Rosmarinus officinalis, Salvia officinalis, Origanum vulgaro,* and combinations thereof. In another embodiment the herb may be rosemary.

The spice may be selected from leaves, flowers, seeds, bark, bulbs, aril and roots, including wattleseed, saffron, ginger, turmeric, grape seed, chilli pepper, cumin, allspice, anise, carraway, cardamom, cassia, cinnamon, clove, coriander, cumin, fennel, fenugreek, galangal, garlic, ginger, horseradish, kokum, mustard, nutmeg, poppy seed, rose, paprika, saffron, sumac, tamarind, turmeric, vanilla, sesame, sarsaparilla, sassafras, tonka bean, and combinations thereof.

In other embodiments the natural antioxidant may be one or more naturally-occurring phenols, polyphenolics, phenolic acids, phenolic esters, phenolic monoterpenes, phenolic diterpenes, carotenoids, curcumin, xanthones, vitamins A, E and C, caffeoyl derivatives, citric acid, ascorbic acid, mono-, di-, or triterpenes, flavanoids, terpenoids, lignans, sulfides, plant sterols, curcumins, stilbenoids, phthalides, tocotrienols, tocopherols, terpenic compounds and combinations thereof.

In one embodiment the natural antioxidant may be rosmanol, 7-methyl-rosmanol, carnosol, carnosic acid or 12-methyl carnosic acid. In other embodiments the natural antioxidant may be caffeic acid, rosmarinic acid, carnosol, carnosic acid, and combinations thereof.

In still a further embodiment the natural antioxidant may be selected from lutein, rutin, anthocyanin, α-pinene, borneol, (−)-camphene, 1,8-cineole, camphor, verbenone, bornyl acetate, 12-O-methylcarnosic acid, a caffeoyl derivative, lupane, oleanane, an ursane triterpene, ursolic acid, quercetin, rofficerone, a monoterpene, myrcene, 7-methylepirosmanol, epirosmanol, camphor, catechin, carvacrol, isoscutellarein 7-O-glucoside, genkwanin, p-Cymene, linalool, gamma-terpinene, thymol, β-pinene, eucalyptol, linoleic acid, rosmariquinone, monoterpenic hydrocarbons, oxygenated monoterpenes, sesquiterpene hydrocarbons, (−)-methyl jasmonate, rosmanol, rosmadial, o-quinone, p-quinone, eriocitrin, luteolin 3-O-beta-D-glucuronide, hesperidin, diosmin, isoscutellarein 7-O-glucoside, hispidulin 7-O-glucoside, gingerol, shogaol, zingerone, 4-hydroxycinnamoyl methane, kaempherol, rhamnetin, capsaicin, capsaicinol, phenolic volatile oils, eugenol, acetyleugenol, ascorbyl palmitate, isoeugenol, tannins, beta-carotene, beta-sitosterol, hydroquinone, linalyl-acetate plant 3-17, myrcene, terpinen-4-ol, cuminal, -γ-terpinene, pinocarveol, linalool, 1-methyl-2-(1-methylethyl)benzene, carotol, isorosmanol, atuntzensin A, rosmanol-7-ethyl ether, dimethoxy-rosmanol, rosmadial, safficinolide, sageone, rosmriquinone (Miltrone), rosmaridiphenol, physcion, apigenin, hispidulin, cirsimaritin, 5,4'-dihydroxy-6,7,8-trimethoxy flavone, 5-hydroxy-7,4'-dimethoxy flavone, methyl and ethyl esters of carnosol, caffeic acid, protocatechuic acid, 2-caffeoyloxy-3-[2-(4-hydroxybenzyl)-4,5-dihydroxy]phenylpropionic acid, flavonoids, eriodictyol, dihydroquercetin, dihydrokaempherol, p-cumene-2,3-diol, gallic acid, salvigenin, luteolin, eupafolin, luteolin-7-O-glucoside, homoplantaginin, apigenin-7-O-glucoside, 6-O-caffeoyl-beta-D-fructofuranosyl-(2->1)-alpha-D-glucopyranoside, 1-O-caffeoyl-beta-D-apiofuranosyl-(1-->6)-beta-D-glucopyranoside, 1-O-p-hydroxybenzoyl-beta-D-apiofuranosyl-(1->6)-beta-D-glucopyranoside, 1-O-(2-hydroxy-5-2-hydroxy-ethyl)phenyl-6-O-trans-caffeoyl)-beta-D-glucopyranoside, 4-O-(5-O-(3,5-dimethoxy-4-hydroxybenzoyl)-beta-D-apiofuranosyl-(1->2)-beta-D-glucopyranoside, 6-O-E-ferroyl-(alpha and beta)-glucopyranoside, (+)-1-hydroxypinoresinol-1beta-D-glucoside, (+)-fraxiresinol-1-beta-D-glucoside and combinations thereof, catechine compounds including (−)-epicatechin (EC), (−)-epicatechin gallate (ECG), (−)-epigallocatechin (EGC), and (−)-epigallocatechin gallate (EGCG), vanillic, chlorogenic and pentacyclic triterpenes such as ursloic, oleanolic, betulinic acid, botulin, alpha-amyrin, beta-amyrin and combinations thereof.

The naturally-occurring compounds may be obtained from natural sources using, for example extraction techniques described above, or alternatively purchased from commercial sources. The natural antioxidant may be food grade or Generally Recognised as Safe (GRAS) specifically approved as antioxidants, fillers, blenders, flavours. This increases the likelihood that the natural antioxidant is safe for use in food packaging.

In some embodiments the food packaging material may further comprise an antioxidant which is an isomer of a natural antioxidant. The isomer may be a structural isomer or a stereoisomer. In one embodiment the antioxidant which is an isomer of a natural antioxidant may be sodium erythorbate.

The food packaging material may comprise a plurality of natural antioxidants. In some embodiments the natural antioxidants may interact synergistically such that the antioxidant activity of a plurality of antioxidants is greater than the sum of the activities of the individual antioxidants. The natural antioxidants may also possess antimicrobial activity.

The invention will now be described in more detail, by way of illustration only, with respect to the following example. The example is intended to serve to illustrate this invention, and should not be construed as limiting the generality of the disclosure of the description throughout this specification.

EXAMPLES

Example 1—Preparation of Antioxidant-Containing Films

A masterbatch comprising food grade rosemary extract and polyethylene resin was prepared. The rosemary extract comprised, by weight: 24-26% total antioxidative phenolic diterpenes with >16% of carnosic acid, 1-4% essential oil, <1% water, less than 2% alcohol, sunflower oil (organic) and cuticular waxes. The masterbatch was added to polymer resin and then extruded to form a thin film.

Example 2—Migration of Antioxidants from Films

Migration testing was conducted to verify that natural antioxidant active compounds migrated out of the antioxidant active film.

The following samples were prepared:

Sample 1: A LDPE film comprising a food grade rosemary extract containing about 7,500 ppm phenolic diterpenes.

Sample 2: A LDPE film comprising a food grade rosemary extract containing about 125 ppm phenolic diterpenes.

Sample 3: A LDPE film comprising a food grade rosemary extract containing about 112.5 ppm phenolic diterpenes.

Sample 4: A HDPE film comprising a food grade rosemary extract containing about 112.5 ppm phenolic diterpenes.

Sample 5: A LDPE film comprising a food grade rosemary extract containing about 25 ppm phenolic diterpenes.

A commercial rosemary extract was also tested as a control (sample 6).

Samples 1 to 6 were subjected to simulation with a simulant protocol in accordance with Australian Standard AS2070-1999. The simulant was 50% ethanol. A 50% solution of ethanol was prepared (50:50 v/v ethanol:milliQ water). 10 cm×10 cm sub-samples of the films were weighed and then extracted under subdued lighting with the 50% ethanol solution. These extracts were analysed by Liquid Chromatography tandem Mass Spectrometry (LCQQQ) and the presence of characteristic ions (m/z 285 and 287 for carnosol and carnosic acid respectively) were monitored.

The characteristic ions were detected for all of samples 1 to 6 thereby providing confirmation of successful carnosol and carnosic acid migration from the test films. The results are depicted in FIGS. 1 to 6.

The concentration of carnosol and carnosic acid in the simulant solutions was able to be semi-quantitatively determined after the contact time of 10 minutes. The concentrations are given in Table 1 below.

| Sample | Carnosol* (mg/L) | Carnosic acid* (mg/L) |
| --- | --- | --- |
| 1 | 7.2 | 8.8 |
| 2 | 0.9 | 1.6 |
| 3 | 0.8 | 1.4 |
| 4 | 1.2 | 1.8 |
| 5 | 0.6 | 0.5 |
| 6 | 21 | 51 |

*Approximate values

Example 3—Antioxidant Properties of the Films

Samples 1, 2 and 4 were subjected to simulation with a real food system to measure the antioxidant properties of the films. The food simulant was extra virgin olive oil (EVOO).

The aim of the simulation was to determine if the antioxidant-containing films were able to protect the food simulant from oxidation.

Bags made of films corresponding to samples 1 and 2 and the bag of sample 4 were placed in contact with EVOO and then stored under either ambient or heated conditions. The aim was to provide the EVOO samples with an opportunity to oxidise thereby allowing the change in peroxide value to be measured over a period of time. EVOO oxidation (increase in peroxide value) was then compared with a control film having no antioxidant.

Each bag was filed with EVOO. The peroxide value of the EVOO was measured at time zero (t=0) to establish a baseline value. Two different EVOO samples were used at different stages of oxidation. Australian EVOO (Red Island brand) had a baseline peroxide value of 12.57 milliEq peroxide/kg. Spanish EVOO (Moro brand) had a baseline peroxide value of 7.92 milliEq peroxide/kg. The EVOO samples were chosen for the trials to ensure any antioxidant effect from the films would be measurable within the test time period of 14 days.

The peroxide value (PV) of each EVOO simulant system was taken at 3 time intervals, t=0 days, t=7 days and t=14 days. In order to accelerate oxidation of the EVOO samples and measure any antioxidant effects, exposure to light, open air and heat were trialled.

Figure 7:
FIG. 7: Bags containing EVOO used in Example 3.
Figure 8:
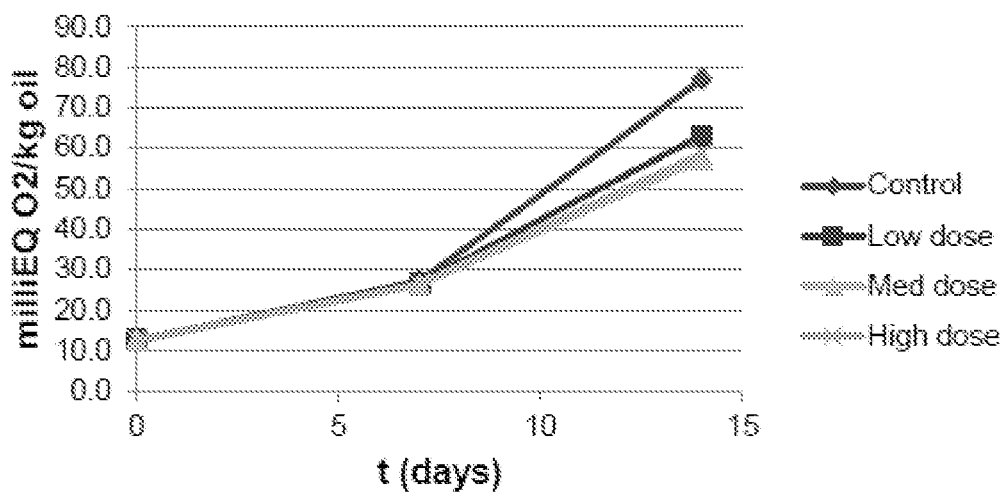
FIGS. 8 and 9: Peroxide value of EVOO stored in freezer bags having varying amounts of antioxidants.
Figure 9:
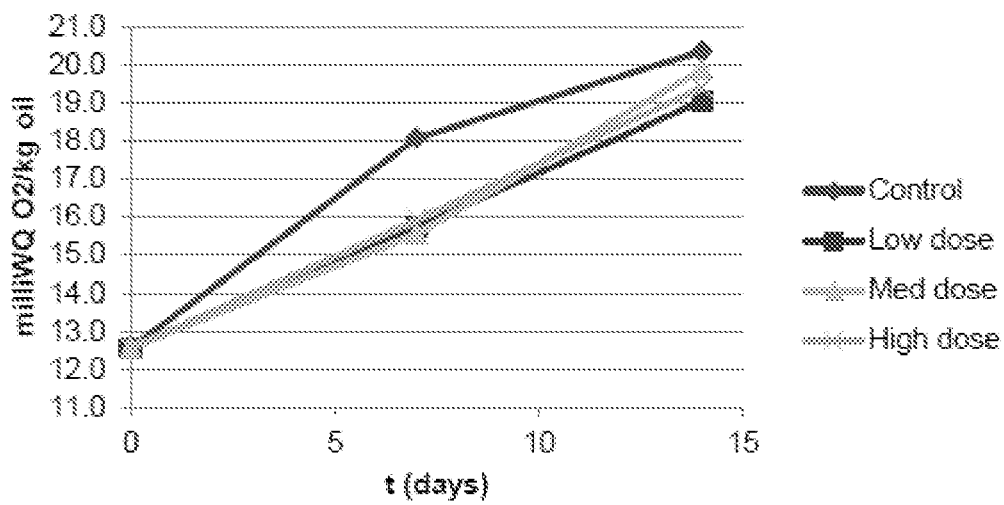

Exposure to light is known to contribute to the oxidation process. The ambient test samples were kept open in full light over the test period (t=14 days). FIG. 7 shows the filing of the bags with EVOO stored at room temperature (21° C.) and exposed to light. FIGS. 8 and 9 show the PV obtained. "Low dose" corresponds to sample 1, "medium dose" corresponds to sample 2 and "high dose" corresponds to sample 4. FIGS. 8 and 9 show that bags with varying amounts of antioxidants consistently delay oxidation independently of the amount.

Embodiments of the present invention provide antioxidant active food packaging which significantly inhibits oxidation reactions and actively releases antioxidant compounds as scavengers of oxygen radicals to protect food from spoilage, colour change and degradation caused by lipid oxidation.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. Food packaging material comprising a polymeric material and a natural antioxidant, wherein:
   the polymeric material is in the form of a single-layer extruded film or sheet; and
   the natural antioxidant comprises a rosemary extract comprising at least 40% carnosic acid and carnosol by weight.

2. Food packaging formed from or comprising the food packaging material of claim 1.

3. The food packaging of claim 2, wherein the food packaging is selected from a wrap, a wrapper, a bag, a container, a tray, a sheet, a carton, a box, a bottle, a bottle cap, a liner, a tube, a barrier sheet, a block, and combinations thereof.

4. The food packaging of claim 3, wherein the bag is a reclosable bag or a freezer bag.

5. A method, comprising:
   forming a mixture comprising a polymeric resin and a natural antioxidant that comprises a rosemary extract comprising at least 40% carnosic acid and carnosol by weight; and
   extruding the mixture to form a single-layer film or sheet of food packaging material.

* * * * *